(12) United States Patent
Andreson et al.

(10) Patent No.: US 12,597,218 B2
(45) Date of Patent: Apr. 7, 2026

(54) EXTENDED REALITY (XR) MODELING OF NETWORK USER DEVICES VIA PEER DEVICES

(71) Applicant: T-Mobile USA, Inc., Bellevue, WA (US)

(72) Inventors: Susan Dawn Andreson, Seattle, WA (US); Eric Foster, Seattle, WA (US); Jim Joojin Song, Atlanta, GA (US); Ali Daniali, Tukwila, WA (US); Brian Garcia, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 191 days.

(21) Appl. No.: 18/488,939

(22) Filed: Oct. 17, 2023

(65) Prior Publication Data

US 2025/0124668 A1     Apr. 17, 2025

(51) Int. Cl.
G06T 19/00      (2011.01)
G06F 3/01      (2006.01)
G06Q 10/083      (2024.01)
G06Q 30/0601      (2023.01)

(52) U.S. Cl.
CPC ............ G06T 19/006 (2013.01); G06F 3/017 (2013.01); G06Q 10/083 (2013.01); G06Q 30/0631 (2013.01)

(58) Field of Classification Search
CPC ........ G06T 19/006; G06F 3/017; G06F 3/011; G06Q 10/083; G06Q 30/0631; G06Q 30/0643
See application file for complete search history.

(56) References Cited

U.S. PATENT DOCUMENTS

| | | | | |
|---|---|---|---|---|
| 8,725,808 | B2 * | 5/2014 | Puente | ................. H04L 69/321 |
| | | | | 709/204 |
| 9,589,288 | B2 * | 3/2017 | Argue | ............... G06Q 30/0641 |
| 9,747,622 | B1 * | 8/2017 | Johnson | ............ G06Q 30/0601 |
| 9,754,416 | B2 | 9/2017 | Kamhi et al. | |
| 9,761,045 | B1 | 9/2017 | Côté et al. | |
| 9,805,355 | B2 * | 10/2017 | Renaldi | ............... G06Q 10/087 |
| 9,928,652 | B2 | 3/2018 | Nicholas et al. | |

(Continued)

FOREIGN PATENT DOCUMENTS

CN          105283824  B      6/2018

*Primary Examiner* — Motilewa Good-Johnson
(74) *Attorney, Agent, or Firm* — Perkins Coie LLP

(57) ABSTRACT

Network subscriber devices simulate peer devices via virtual models displayed within a real-time capture of a physical environment, as an extended reality (XR) experience for users. Immersion of the XR experience is enhanced based on layering the virtual model of a simulated device in relation to digits of a user included within the real-time capture, thus appearing like the user is holding the simulated device. The digits of the user that are layered above the virtual model can be tracked such that the user can move these digits to make virtual inputs to the simulated device that can cause virtual display content shown with the virtual model to change. Device specification information is also shown within the XR experience. Via the XR experience, network subscribers can be better informed on devices available for use on a telecommunication network and can immediately acquire devices being simulated within the XR experience.

20 Claims, 8 Drawing Sheets

(56) References Cited

U.S. PATENT DOCUMENTS

| | | | |
|---|---|---|---|
| 9,953,288 B2 | 4/2018 | Soon-shiong | |
| 10,013,901 B2 * | 7/2018 | Chapuis | G06Q 30/0641 |
| 10,026,229 B1 * | 7/2018 | Yalniz | G06T 7/74 |
| 10,176,471 B2 * | 1/2019 | Hodges | G07F 13/065 |
| 10,223,755 B2 * | 3/2019 | Alapati | G06Q 50/01 |
| 10,467,814 B2 | 11/2019 | Loberg et al. | |
| 10,467,817 B1 | 11/2019 | Yip | |
| 10,509,619 B2 * | 12/2019 | Todeschini | G06Q 30/016 |
| 10,607,385 B2 * | 3/2020 | Parks | G06T 11/60 |
| 10,650,609 B2 | 5/2020 | Kohlhoff | |
| 10,915,237 B2 | 2/2021 | Haug | |
| 11,126,845 B1 * | 9/2021 | Chaturvedi | G06F 3/011 |
| 11,163,417 B2 | 11/2021 | Hauenstein et al. | |
| 11,321,044 B2 * | 5/2022 | Todeschini | G06Q 30/016 |
| 11,593,132 B1 * | 2/2023 | Rane | G06F 9/45558 |
| 11,775,130 B2 * | 10/2023 | Oser | G06Q 30/0613 |
| | | | 715/757 |
| 11,816,800 B2 * | 11/2023 | Oser | G06Q 30/016 |
| 12,279,017 B1 * | 4/2025 | Wang | H04N 21/47815 |
| 2008/0142599 A1 * | 6/2008 | Benillouche | G06Q 30/02 |
| | | | 235/462.41 |
| 2010/0306080 A1 * | 12/2010 | Trandal | G06Q 10/10 |
| | | | 705/26.8 |
| 2011/0164163 A1 * | 7/2011 | Bilbrey | G06F 3/0488 |
| | | | 348/E5.022 |
| 2012/0036440 A1 * | 2/2012 | Dare | G06F 9/452 |
| | | | 715/734 |
| 2013/0155307 A1 * | 6/2013 | Bilbrey | H04N 23/661 |
| | | | 345/173 |
| 2014/0172570 A1 * | 6/2014 | Y Arcas | G06Q 30/0261 |
| | | | 705/14.58 |
| 2014/0208272 A1 * | 7/2014 | Vats | G06F 3/04845 |
| | | | 715/852 |
| 2014/0310056 A1 * | 10/2014 | Alapati | G06Q 50/01 |
| | | | 705/7.28 |
| 2014/0337174 A1 * | 11/2014 | Lin | G06Q 30/0269 |
| | | | 705/26.61 |
| 2015/0170260 A1 | 6/2015 | Lees et al. | |
| 2015/0193977 A1 * | 7/2015 | Johnson | G06F 3/06 |
| | | | 345/419 |
| 2015/0371321 A1 * | 12/2015 | Chapuis | G09F 3/208 |
| | | | 705/27.1 |
| 2016/0071319 A1 * | 3/2016 | Fallon | G09G 5/003 |
| | | | 345/633 |
| 2016/0171775 A1 * | 6/2016 | Todeschini | G06T 11/60 |
| | | | 345/633 |
| 2016/0189288 A1 * | 6/2016 | Todeschini | G06K 7/1413 |
| | | | 705/27.2 |
| 2016/0284014 A1 * | 9/2016 | Adel | G06Q 10/087 |
| 2018/0032988 A1 * | 2/2018 | Renaldi | G06Q 20/322 |
| 2019/0068580 A1 * | 2/2019 | Amid | H04L 67/131 |
| 2019/0164325 A1 * | 5/2019 | Parks | G06K 7/10297 |
| 2020/0320792 A1 * | 10/2020 | Sadalgi | G06F 3/017 |
| 2021/0005022 A1 * | 1/2021 | Oser | G06Q 30/0281 |
| 2021/0247846 A1 | 8/2021 | Shriram et al. | |
| 2024/0062279 A1 * | 2/2024 | Scully | G06F 3/013 |
| 2024/0273594 A1 * | 8/2024 | Scully | G06T 19/20 |
| 2024/0273597 A1 * | 8/2024 | Scully | G06F 3/017 |
| 2025/0124668 A1 * | 4/2025 | Andreson | G06T 19/006 |

* cited by examiner

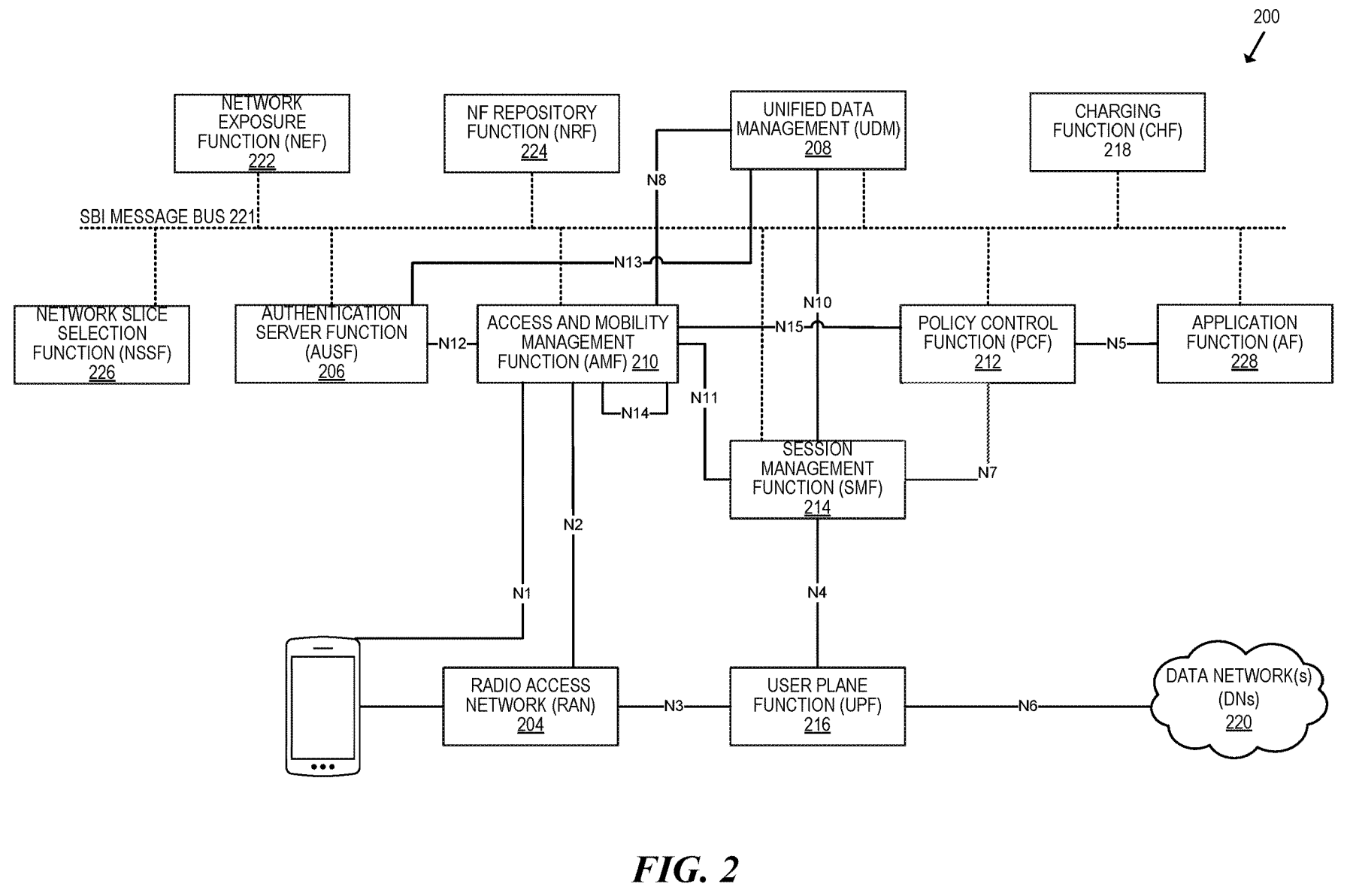

200

CHARGING FUNCTION (CHF) 218

APPLICATION FUNCTION (AF) 228

DATA NETWORK(s) (DNs) 220

POLICY CONTROL FUNCTION (PCF) 212

N5

UNIFIED DATA MANAGEMENT (UDM) 208

N7

SESSION MANAGEMENT FUNCTION (SMF) 214

N6

N10

N15

USER PLANE FUNCTION (UPF) 216

N4

N11

N8

ACCESS AND MOBILITY MANAGEMENT FUNCTION (AMF) 210

N14

N13

NF REPOSITORY FUNCTION (NRF) 224

N3

RADIO ACCESS NETWORK (RAN) 204

N2

N1

N12

NETWORK EXPOSURE FUNCTION (NEF) 222

AUTHENTICATION SERVER FUNCTION (AUSF) 206

SBI MESSAGE BUS 221

NETWORK SLICE SELECTION FUNCTION (NSSF) 226

*FIG. 2*

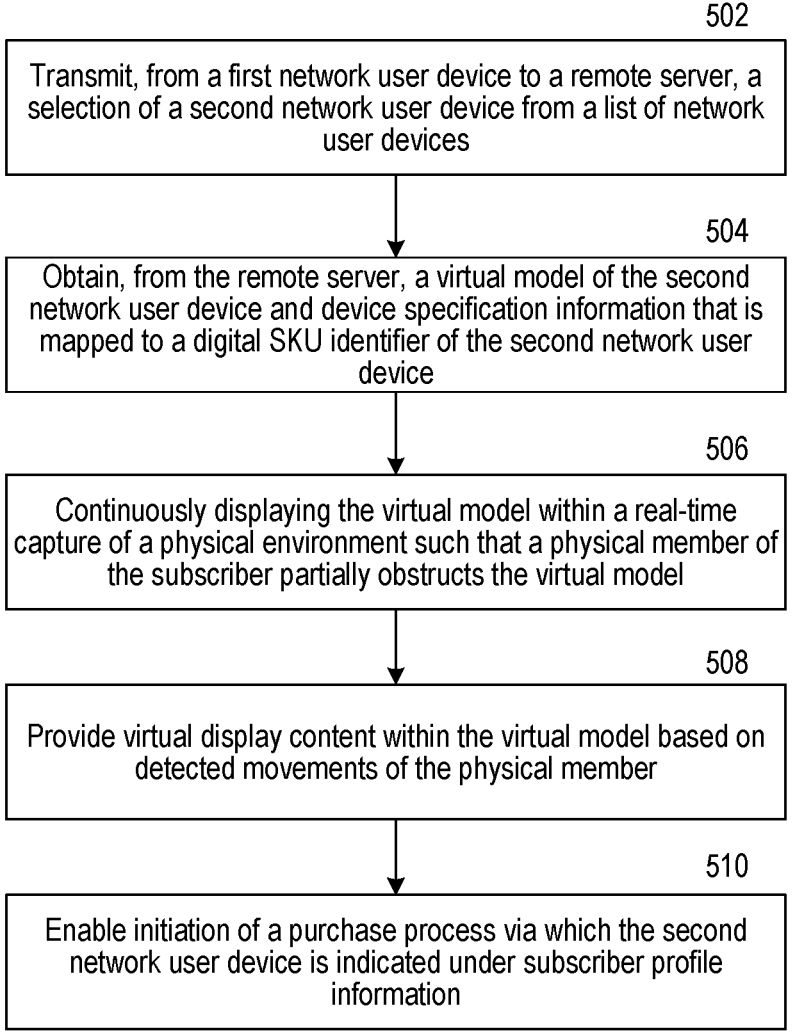

502

Transmit, from a first network user device to a remote server, a selection of a second network user device from a list of network user devices

504

Obtain, from the remote server, a virtual model of the second network user device and device specification information that is mapped to a digital SKU identifier of the second network user device

506

Continuously displaying the virtual model within a real-time capture of a physical environment such that a physical member of the subscriber partially obstructs the virtual model

508

Provide virtual display content within the virtual model based on detected movements of the physical member

510

Enable initiation of a purchase process via which the second network user device is indicated under subscriber profile information

EXTENDED REALITY (XR) MODELING OF NETWORK USER DEVICES VIA PEER DEVICES

BACKGROUND

Telecommunication networks support communication services for many different models of user devices. User device models can differ with respect to technical specifications, network service capabilities or compatibilities, and the like. A need exists for a network subscriber to use network user devices that are suitable for the network subscriber to use on a telecommunication network.

BRIEF DESCRIPTION OF THE DRAWINGS

Detailed descriptions of implementations of the present invention will be described and explained through the use of the accompanying drawings.

FIG. 2 is a block diagram that illustrates 5G core network functions (NFs) that can implement aspects of the present technology.

FIG. 5 is a flow diagram that illustrates example operations for XR modeling of network user devices via peer devices.

Figure 1:
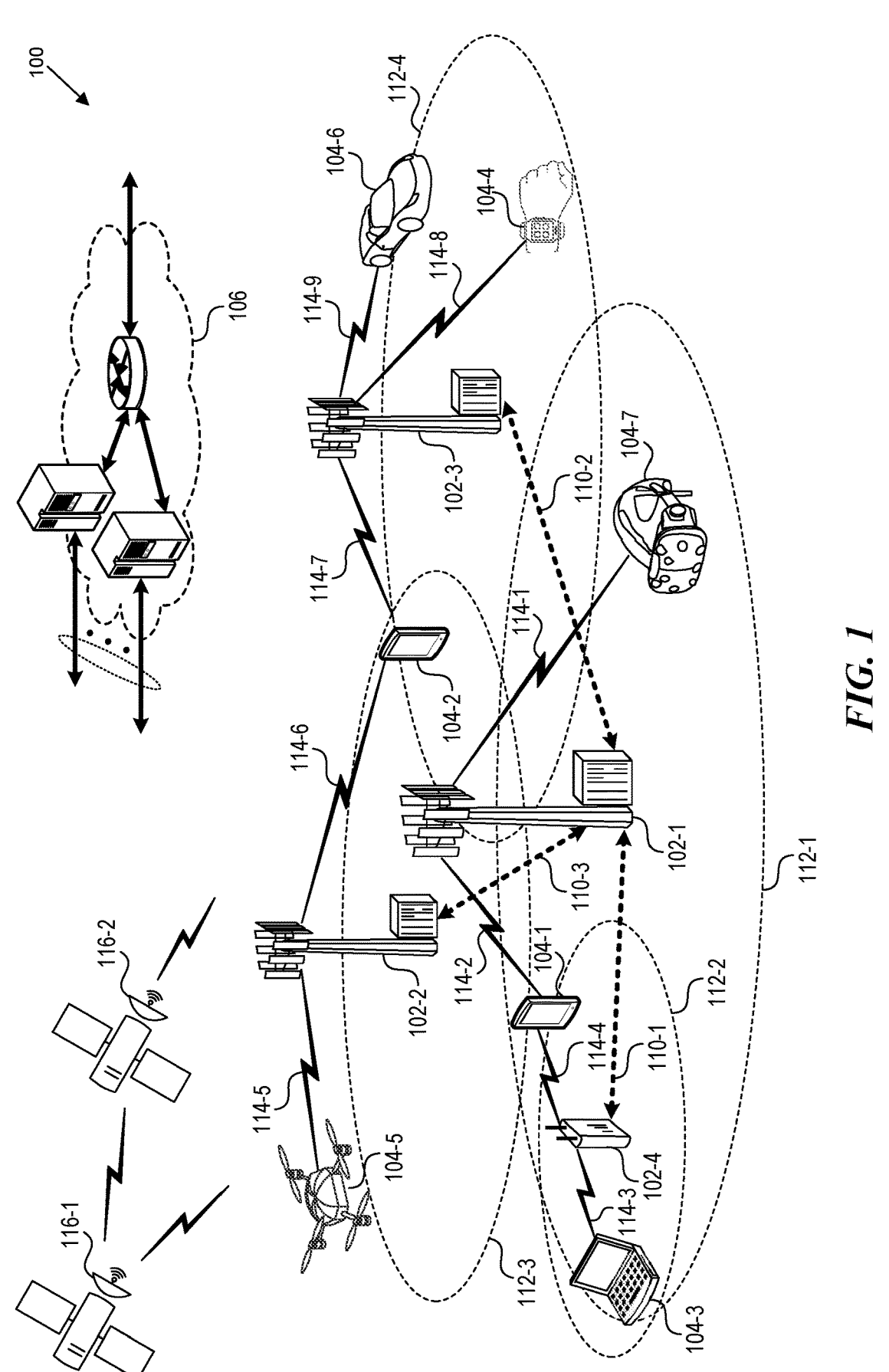
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present disclosure provides technical solutions for network subscribers to obtain suitable network user devices to use on a telecommunication network based on virtual interaction and simulation of different device models. According to example embodiments, a system provides virtual models of network user devices, such as mobile phones, within an extended reality (XR) environment on a peer device being currently operated by a network subscriber. XR-based modeling or simulation of different devices allows network subscribers to compare different devices and test whether the different devices are suitable for subscriber-specific uses. Thus, example embodiments described herein provide technical solutions to needs long-felt by network subscribers.

For example, network subscribers frequently experience a need to research, identify, and obtain new mobile phones to use on a telecommunication network, as the telecommunication network evolves to provide updated communication services and/or as the devices currently used by the subscribers deteriorate towards degraded functionality or inoperability. Different network subscribers have different degrees of network usage (e.g., mostly voice calls versus interactive gaming and video use), abilities to operate technical features (e.g., simple flip-phone user input versus highly customizable smart phones), and capabilities to physically handle and operate a device and/or a device's hardware features (e.g., large form factor devices (suitable for users with larger hands) versus smaller devices). Via the technical solutions described herein, a system provides a subscriber with an XR experience in which the subscriber can select different devices, virtually examine physical characteristics of a device, attach virtual models of the device with virtual complementary components, operate the virtual model of the device to understand its user interface, and/or the like.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Wireless Communications Systems

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Example 5G Core Network Functions

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (Afs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Example Implementations of XR Modeling of Network User Devices

Example embodiments provide implementations for an XR experience in which a network subscriber is able to test, interact with, and operate virtual models of subscriber devices. An enhanced simulation of a subscriber device is provided based on tracking movements of digits of a subscriber and mapping the movements to inputs with respect to an operating system of the subscriber device. As such, a display of a virtual model of a device can be dependent on how a subscriber is physically grasping or holding the subscriber device providing the display, with respect to which hand and digits of the subscriber are being captured and tracked. Further, in some embodiments, the XR experience can leverage subscriber information or profiles to enable an efficient and/or automatic assignment or purchase of subscriber devices tested by a subscriber via the XR experience.

Figure 3:
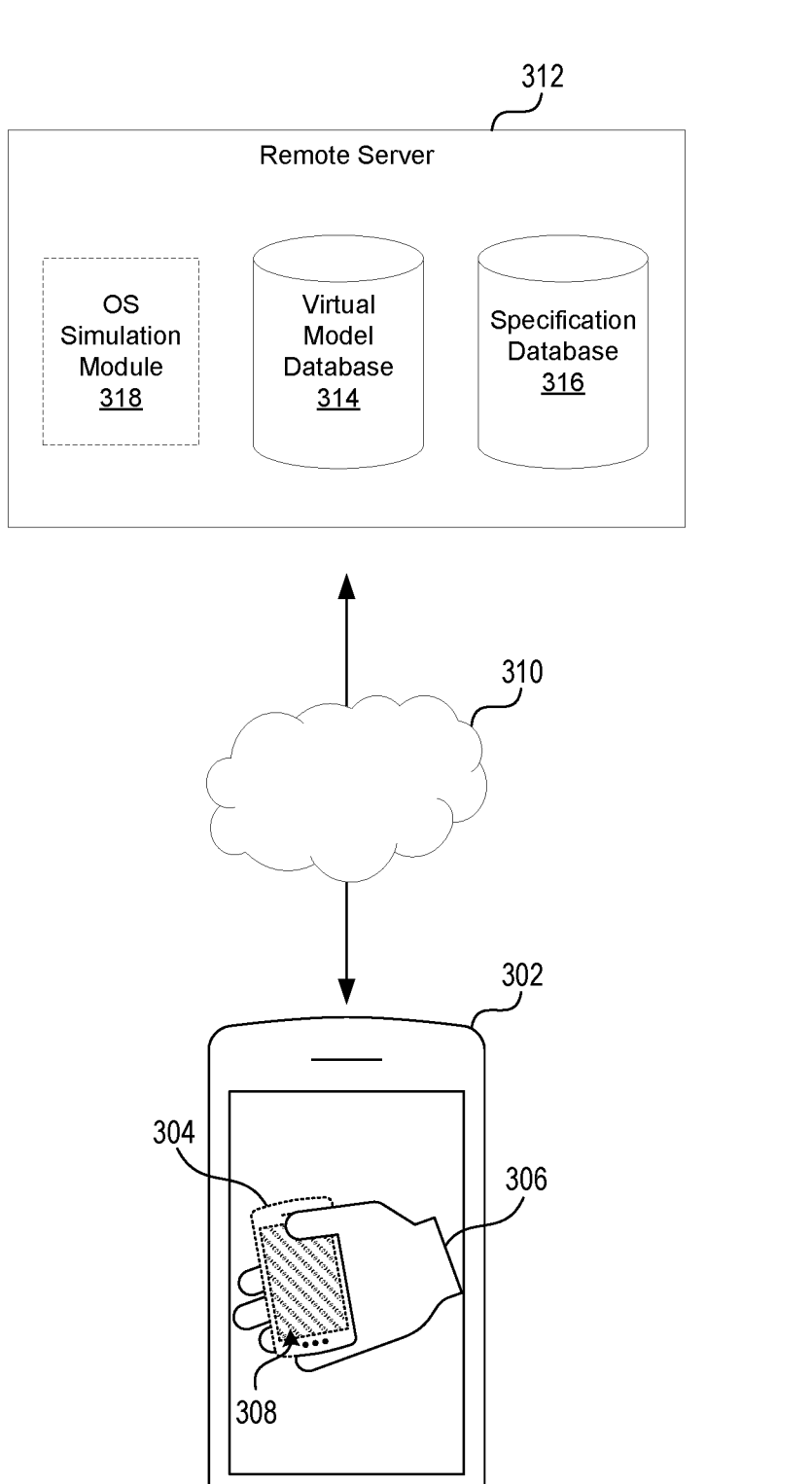
FIG. 3 is a block diagram that illustrates an example system for extended reality (XR) modeling of a network user device via a peer device.

FIG. 3 illustrates an example of a system 300 for XR modeling of network user devices via another network user device or a peer device. In the system 300, a network subscriber for a telecommunication network operates a subscriber device 302. In some examples, the subscriber device 302 can be a smartphone, a mobile phone, a tablet, smart watch, portable gaming device, or other computing device configured to use the telecommunication network. Further, according to example embodiments, the subscriber device 302 is capable of providing an XR experience, and as such, the subscriber device 302 can include one or more cameras for capturing real-time video or images of a physical environment, in some embodiments. As referred to herein, XR can generally refer to an integration or combination of a real world and a virtual world, as realized for example in augmented reality (AR), virtual reality (VR), mixed reality (XR), and/or the like.

According to example embodiments, the subscriber device 302 provides to the network subscriber an XR experience in which the network subscriber can interact with a virtual model 304 of another subscriber device, such as a device that the network subscriber is interested in purchasing, a device that the network subscriber can replace the subscriber device 302 with, and/or the like. In some embodiments, the virtual model 304 visually depicts a peer device for the subscriber device 302. Peer devices may generally refer devices of a similar class (e.g., a smartphone class, a tablet class), devices of a similar model or devices manufactured under the same brand, devices that other network subscribers similar to the network subscriber use, and/or the like.

By virtue of the XR experience, the subscriber device 302 can visually capture in real-time a physical member or portion of the subscriber, such as a hand 306 of the user, and the subscriber device 302 displays the virtual model 304 in relation to the user's hand that it visually captures. In some examples, the hand 306 that is visually captured by the subscriber device 302 is opposite to another hand that the network subscriber uses to grasp, hold, and operate the subscriber device 302.

In some embodiments, the subscriber device 302 implements a local user application via which the XR experience (with the virtual model 304) is provided. For example, the local user application is configured to operate a camera of the subscriber device 302, identify and/or track physical objects visually captured via the camera (e.g., using image processing and/or classification techniques), and insert or overlay virtual objects (e.g., the virtual model 304) into the visual capture from the camera. In some embodiments, the local user application is a client application that communicates with an application server to receive display data related to the virtual model 304. In some embodiments, the subscriber device 302 provides the XR experience based on accessing a web application and streaming visual capture data generated by its camera to a web server at which the XR experience is generated.

In some embodiments, the XR experience provided by the subscriber device 302 further includes virtual display content 308 being shown with the virtual model 304 of a peer device. The virtual display content 308 simulates content displayed by the peer device. In some embodiments, the virtual display content 308 is dynamic, or changes over time in response to inputs by the network subscriber. In particular, the network subscriber, via a digit of the hand 306 included in the XR experience, can make virtual inputs in relation to the virtual model 304 of the peer device. To do so, the subscriber device 302 can track movements of digits of the hand 306 included in the XR experience, map a movement or position of the digits relative to a position of the virtual model 304, and determine virtual inputs to the peer device simulated by the virtual model 304 based on the mapped movements or positions of the subscriber's digits. In some embodiments, the virtual inputs for the virtual model 304 are determined based on voice commands detected by the subscriber device 302.

In the system 300, the subscriber device 302 can communicate with and receive information via a network 310 from a remote server 312 to provide the XR experience to a user of the subscriber device 302. In some examples, the network 310 is a local area network, a peer-to-peer or paired network, a telecommunication network, and/or the like. In some examples, the network 310 is the telecommunication network to which the subscriber device 302 subscribes, and the subscriber device 302 uses device-specific information and/or subscriber-specific information to provide the XR experience. As one example, the subscriber device 302 receives or determines signal quality measurements from the telecommunication network which are indicated/displayed to a user, and the subscriber device 302, in order to provide enhanced immersion and simulated reality, can also include the same signal quality measurements in the virtual display content 308 displayed with the virtual model 304.

Turning to the remote server 312, the remote server 312 can include a virtual model database 314, in some embodiments. The virtual model database 314 stores virtual models for a set of devices that a network subscriber can select for the XR experience. The virtual models can be three-dimensional, or can include visual data for multiple physical dimensions or aspects of a device. In some embodiments, the virtual model database 314 at least stores generic virtual models for devices, from which variations or alternate versions of a virtual model can be derived. For example, different colors can be painted onto a generic virtual model of a smartphone in order to supply virtual models of different colors. The remote server 312 can transmit a virtual model stored in the virtual model database 314 to the subscriber device 302 via the network 310 for the subscriber device 302 to provide the XR experience with the transmitted virtual model.

In some embodiments, in order to improve operational efficiency and reduce network load and occupancy, the virtual model database 314 includes visual comparison data, which can be used to derive a virtual model of a peer device from another virtual model. In some embodiments, due to network subscribers frequently replacing their devices with simply a newer model of their current device, replacing their devices with devices of a similar/same build or manufacturer, and/or generally replacing their devices with peer devices, the subscriber device 302 can locally store a virtual model of itself. Accordingly, the subscriber device 302 can use visual comparison data associated with a given peer device to visually alter the virtual model of itself to derive and generate a virtual model of the given peer device without large data files for the virtual models being transmitted via the network 310 between the subscriber device 302 and the remote server 312.

Devices available for use with the telecommunication network and offered for purchase by the network operator of the telecommunication network can be identified by stockkeeping units (SKUs) or digital identifiers that uniquely identify the devices for purchase, distribution, assignment, and/or the like. Prior to the XR experience being provided on the subscriber device 302, the user of the subscriber device 302 can specify a device to be simulated in the XR experience. When specifying the device via an online shop, marketplace, or platform provided by the network operator, for example, the subscriber device 302 can indicate the SKU of the specified/selected device to the remote server 312 in order to receive the virtual model of the specified/selected device. For example, the virtual model database 314 associates or keys SKUs with virtual models (or visual comparison data) stored therewithin.

In some embodiments, the remote server further includes a specification database 316. The specification database 316 can store device specification information for the devices available for use with the telecommunication network and offered for purchase by the network operator of the telecommunication network. In some examples, the specification database 316 associates or keys SKUs of the available/offered devices with the respective device specification information. The device specification information describes the technical features including hardware features such as camera quality or screen size, software features such as supported operating systems, firmware or other features such as network compatibility, and/or the like for a given device. This information can be indicated to a user being provided with an XR experience so that the user is aware of the technical features of the device being simulated within the XR experience. In some embodiments, the remote server 312 provides the device specification information with the virtual model (or visual comparison data) for a device specified by a SKU to the subscriber device 302 via the network 310.

In some embodiments, the remote server 312 includes an OS simulation module 318. The OS simulation module 318 is configured to simulate an operating system of a simulated device in order to determine the dynamic visual display content to be displayed with the simulated device, for example, in response to virtual inputs by a user (e.g., based on the user moving physical digits in physical relation to the virtual model 304, based on the user uttering voice command that are detected by audio sensors of the subscriber device 302). For example, the OS simulation module 318 can simulate Android or other mobile operating system such that an interactable home screen of a simulated device can be shown as the visual display content 308 with the virtual model 304. By way of the OS simulation module 318 simulating a mobile operating system of the device simulated by the virtual model 304, the visual display content 308 can be realistically updated and provided in response to the virtual inputs by the user. In some embodiments, the subscriber device 302 transmits the determined/detected virtual inputs by the subscriber to the OS simulation module 318 and receives the visual display content 308 from the OS simulation module 318.

In some embodiments, the OS simulation module 318 is implemented instead by the subscriber device 302, such that the subscriber device 302 can locally determine the visual display content 308 according to the mobile operating system of the device simulated by the virtual model 304. In some embodiments, the peer device being simulated in the XR experience provided by the subscriber device 302 has the same mobile operating system as the subscriber device 302. Accordingly, the subscriber device 302 can generate an instance of the mobile operating system from which the visual display content 308 can be determined.

Subscriber-specific actions and information can be integrated into the system 300 in which a device for a telecommunication network (e.g., a network user device) is simulated in an XR experience for a network subscriber. In some embodiments, the system 300 (or the remote server 312) includes a subscriber management system that stores subscriber-specific information or subscriber profile information. This information can indicate a list of network user devices previously or historically used by the subscriber, devices currently being used by the subscriber, a degree of network usage or usage of specific network services (e.g., usage of voice calling versus texting versus mobile data), and/or the like. This subscriber-specific information can be used to filter a list of devices that are available for the network subscriber to simulate in the XR experience. Further, the system 300 including a subscriber management system can enable an automatic or immediate purchase of a device being simulated in the XR experience. For example, the network subscriber becomes satisfied with a certain device being simulated and desires to acquire the certain device as their new network user device (e.g., to replace the subscriber device 302, in some examples). Within the XR experience, the subscriber device 302 can provide an option to immediately acquire or purchase the device, which is enabled based on payment/billing information included with the subscriber-specific information managed by the subscriber management system and other data that may control subscriber eligibility for the purchase, subscription parameters for the subscriber, and/or the like. The acquisition or purchase of a device can include storing the SKU of the device, and/or other unique identifiers for the device (e.g., including serial numbers, manufacturing numbers, etc.), under the subscriber profile information.

Figure 4A:
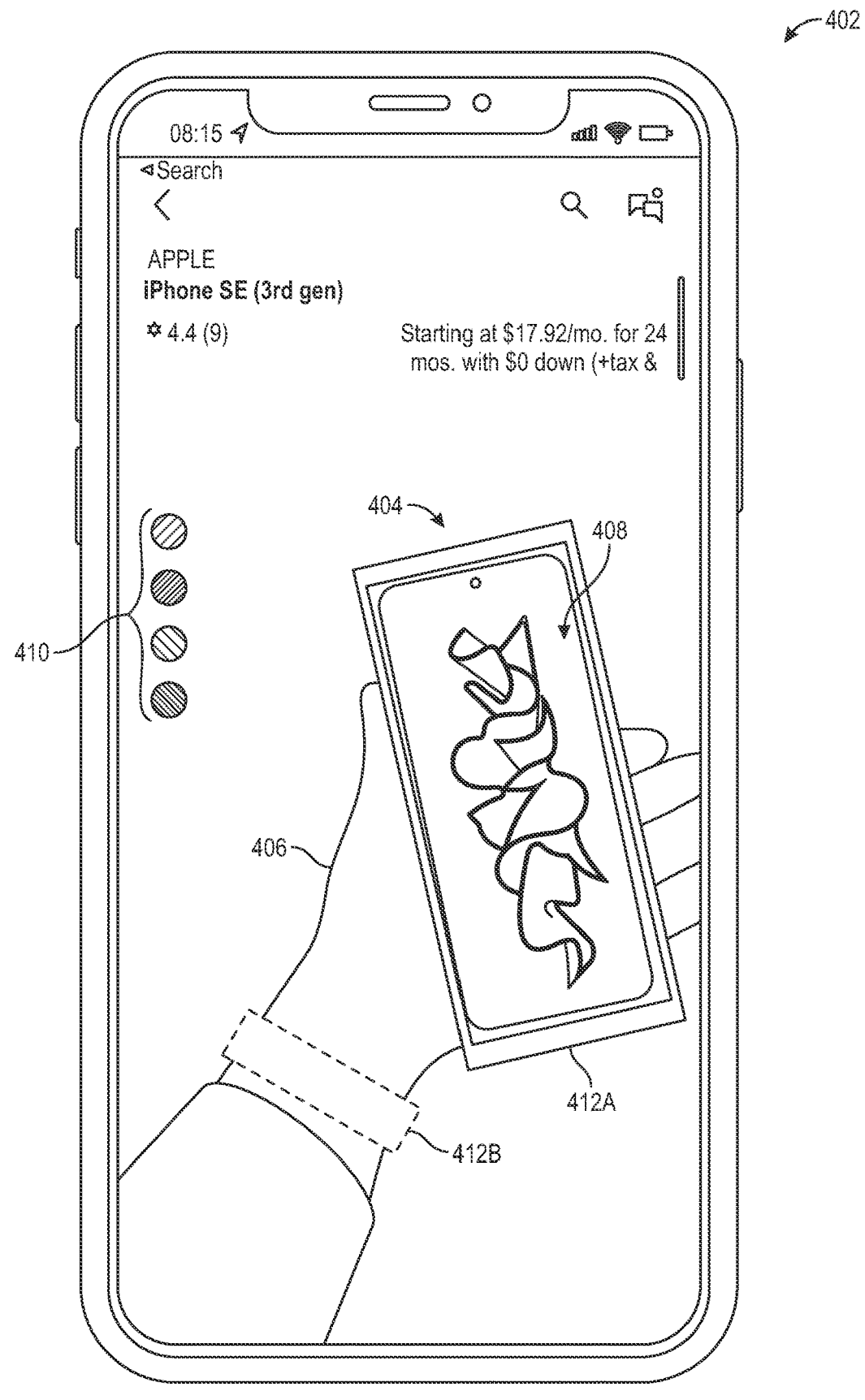
FIGS. 4A-4C illustrate example views of XR models of network user devices provided via peer devices.
Figure 4B:
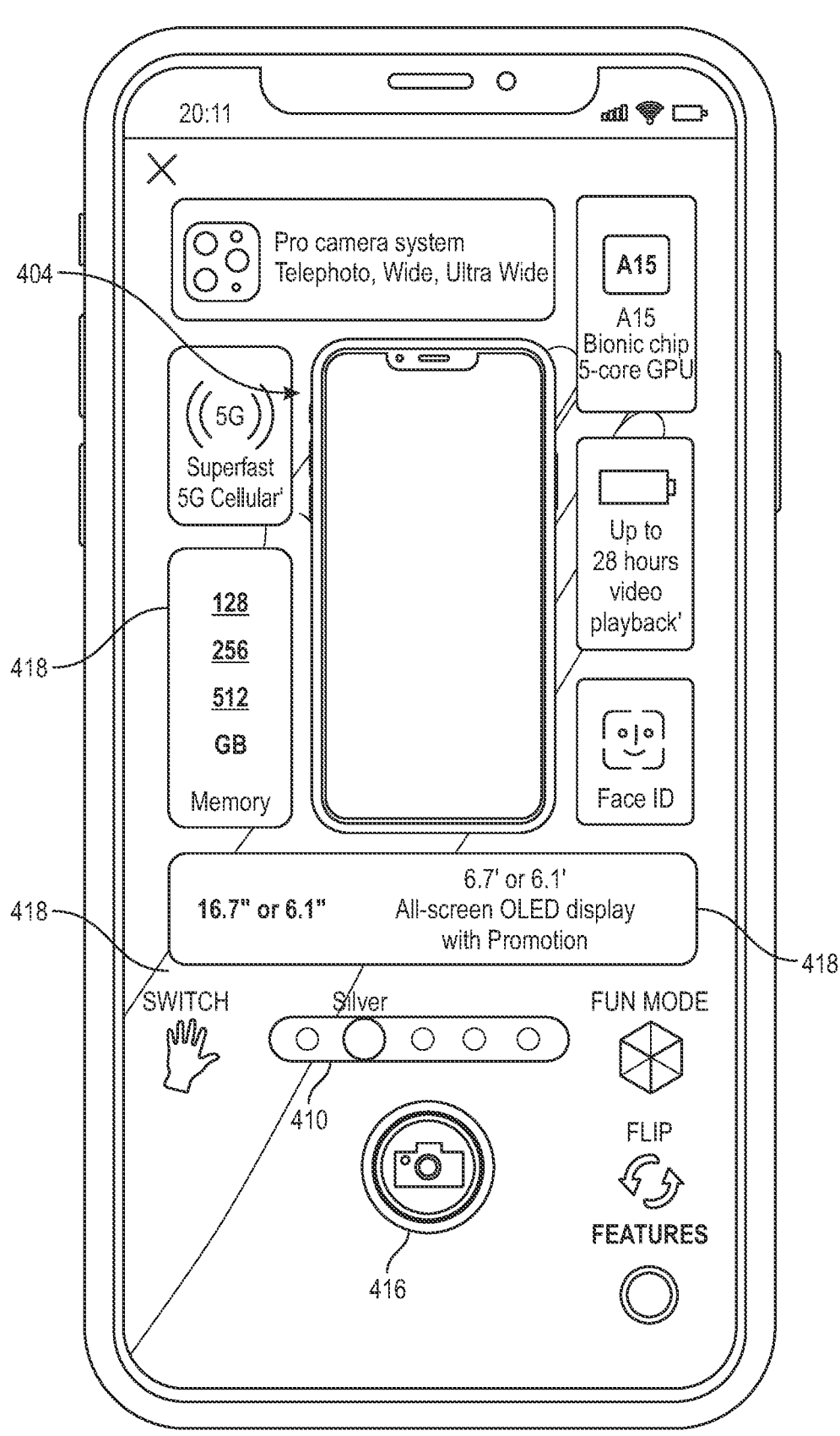
Figure 4C:
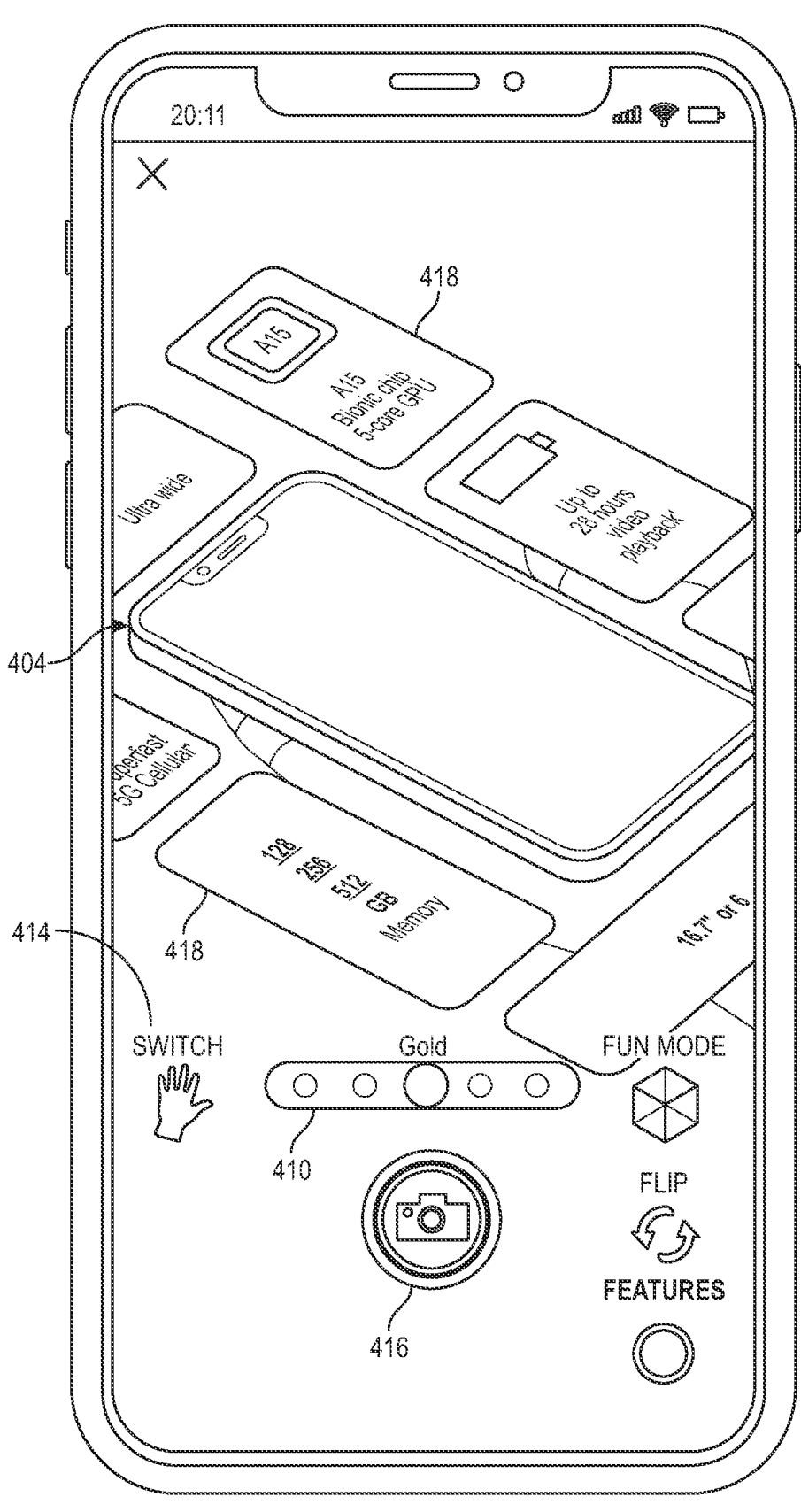

FIGS. 4A-4C illustrate example views of XR models of network user devices provided via peer devices. Turning first to FIG. 4A, a device 402 provides a XR experience that includes a virtual model 404 of another device being displayed with aspects of a real physical world, including a hand 406 of the user of the device 402. Visual display content 408 is dynamically displayed with/on/in the virtual model 404 responsive to movements of the hand 406 of the user of the device 402, or specifically responsive to tracked movements of digits of the hand 406 (e.g., a thumb) that are assigned to a higher perceived three-dimensional depth above the virtual model 404. FIG. 4A demonstrates that the virtual model 404 can be selected from a set 410 of virtual models or a set of peer devices. In the illustrated example, the set 410 of virtual models or peer devices includes different color variations of a device model. In some examples, the set 410 includes different device models. In some embodiments, the set 410 of different options is shown during the XR experience such that the user can change the device or device model being simulated during the XR experience. By doing so, the user can rapidly switch between the device being simulated in the XR experience to quickly compare the physical characteristics of different devices or models.

FIG. 4A also demonstrates XR simulation of complementary components or compatible products 412 with the virtual model 404. Complementary components or compatible user products may refer to products, apparatuses, devices, and the like that are usable with the device being simulated by the virtual model 404. For example, compatible user products can include wearable devices communicable with the simulated device (e.g., a smart watch 412A), audio accessories such as earphones or a microphone configured to receive output signals from the simulated device and/or to provide input signals to the simulated device, hardware or physical products including a phone case 412B, and/or the like. Similar to the display of the virtual model 404 of a network user device, the device 402 can additionally display virtual models of compatible products, or virtual complementary products. In doing so, relative physical properties such as bulk or volume of the simulated device and compatible products can be better ascertained by a user. Depending on the compatible product simulated, a compatible product such as a phone case can be displayed as fitted around or onto the virtual model 404. In some embodiments, the user of the device 402 can select one or more compatible products 412 to be simulated in the XR experience. In particular, the compatible products 412 simulated in the XR experience can be selected from a set of products pre-defined as compatible with the device being simulated by the virtual model 404.

FIGS. 4B and 4C illustrate another example of an XR experience in which a virtual model 404 of a network user device is displayed within a physical environment visually captured by a device. In the XR experience, a user can select the network user device that is simulated by the virtual model 404 from a set 410 of network user devices. In the illustrated example, the XR experience includes a handedness feature 414 that is interactable or selectable by the user to control tracking of physical digits in the XR experience and to improve ergonomic comfort during the XR experience. In particular, the XR experience is provided via a user device being grasped or held by a user in one hand, while the opposite hand of the user is visually captured by the user device and included in the XR experience (by the virtual model 404 being positioned with or overlaid on the opposite hand). The handedness feature 414 may be interactable or selectable by the user to indicate to the user device that the user has switched to grasping/holding the user device in the opposite hand and the specify that the originally-grasping/holding hand of the user will now be visually captured by the user device. By using the handedness feature 414, the tracking of digit movement for mapping virtual inputs to the virtual model 404 can be improved based on the user device being aware of which hand (a left hand versus a right hand) having digits to be tracked within the XR experience. Therefore, accuracy and immersive-ness of the XR experience can be maintained while the user changes grips on the user device, for example, due to comfort and/or ergonomic needs. In some embodiments, the handedness of digits to be tracked within the XR experience can be at least initially determined by object recognition or classification techniques implemented for the XR experience, and use of the handedness feature 414 reduces reliance of such techniques, which can be computationally-intensive. In some embodiments, for example alternative to the handedness feature 414, the device can automatically determine that the user has switched its grasp on the user device or that the handedness has changed based on movements of the device that are sensed by an accelerometer, gyroscope, and/or other sensors included in the device.

As also demonstrated in FIG. 4B-4C, example embodiments of the XR experience include snapshotting of the XR experience, for example via a snapshotting feature 416 that is interactable or selectable by a user of the user device via which the XR experience is provided. Snapshotting of the XR experience comprises generation of a snapshot image of a point in time during the XR experience. The generated snapshot image can include both the virtual and physical features of the XR experience, including, for example, a physical hand of a user and a virtual model 404 of a network user device simulated in the grasp of the physical hand of the user. The user can select or interact with the snapshotting feature 416 at a point in time to cause the user device to responsively generate a snapshot image for that point in time. In some embodiments, the generated snapshot image is saved/stored to a local memory of the user device. In some embodiments, the generated snapshot image is stored with network subscriber information or a subscriber profile associated with the user. Further, in some embodiments, the snapshot image is generated to include or be embedded with a resource reference, such as a web link or a deep link to a local user application on the user device, that can be later used to cause the user device to automatically restart the XR experience with the same virtual model, to automatically initiate a purchase or acquisition process for the device virtually simulated within the snapshot image, to automatically retrieve device specification information for the device virtually simulated within the snapshot image, and/or the like. For example, the resource reference embedded within a snapshot image can take the user to a web application in which the device virtually simulated within the snapshot image is pre-selected and loaded in an online purchase cart, or cause the device to automatically open a user application on the device in which the XR experience was provided.

FIGS. 4B and 4C further demonstrate the visual display of device specification information within the XR experience, and in particular, the visual anchoring of the device specification information with the virtual model 404 of a device. As discussed above, the user device providing the XR experience can obtain device specification information for the device being simulated by a virtual model within the XR experience. In the illustrated examples, the device specification information includes camera specifications, network compatibility ("Superfast 5G cellular"), memory storage amount(s), display screen resolution, security features, processor specification, and the like. The device specification information can be indicated within virtual containers 418 that are displayed in the XR experience with the real-time visual capture of a physical environment. In some embodiments, the virtual containers 418 that indicate the device specification information are positionally anchored with the virtual model 404. By being positionally anchored with the virtual model 404, the virtual containers 418 can be affixed to a perceived three-dimensional position or depth near or adjacent to that of the virtual model 404. As the perceived three-dimensional position or depth of the virtual model 404 changes within the XR environment, the perceived three-dimensional position or depth of the virtual containers 418 changes accordingly. Thus, for example, if the user waves the virtual model 404 of a device around (based on the user waving its hand around), the virtual containers 418 with the device specification information can follow the virtual model 404.

FIG. 5 illustrates a method including example operations for XR modeling of network user devices via peer devices. In some embodiments, the example operations are performed by a device (e.g., a network user device, a subscriber device) to simulate a similar device (e.g., a second network user device, a peer device) in an XR experience for a network subscriber.

At 502, the device transmits, to a remote server, a selection of a network user device from a list of network user devices. In some embodiments, the device provides the list of network user devices determined according to subscriber information associated with a user of the device, or a list of network user devices similar to the device (e.g., with respect to brand/manufacturer, with respect to specification features such as camera quality). In some embodiments, the selection of the network user device includes a SKU of the network user device, due to the remote server storing virtual models and device specification information that are identifiable and retrievable using SKUs.

At 504, the device obtains, from the remote server, a virtual model of the network user device and device specification information that is mapped to a digital SKU identifier of the network user device. The virtual model includes three-dimensional aspects of the network user device that can be displayed in an XR experience.

At 506, the device continuously displays the virtual model within a real-time capture of a physical environment such that a physical member (e.g., a digit) of the subscriber partially obstructs the virtual model. The device continuously displays the virtual model in relation to a hand of the subscriber that is visually captured, such that the virtual model appears to be grasped or held by the hand of the subscriber. In aid in the accuracy and immersion of the virtual model being grasped, the physical member, such as a thumb, is overlaid the virtual model.

At 508, the device provides virtual display content with the virtual model based on detected movements of the physical member. The overlaid physical member can be tracked such that the user can move the overlaid physical member to provide virtual inputs that can cause dynamic changes to virtual content shown on a display screen of the virtual model. In some embodiments, display of the virtual model and tracking of the overlaid physical member can be assisted or enabled based on a handedness (which one of a left hand or a right hand is visually captured in the XR experience) being determined by the device.

At 510, the device enables an assignment, an acquisition, a purchase, or the like of the network user device during the continuous display of the virtual model of the network user device. For example, the device can initiate an acquisition/purchase process. In example acquisition/purchase processes, the device can be delivered or assigned to the network subscriber (e.g., replacing the current subscriber device), the device can be identified or indicated under subscriber profile data or information managed by the network operator, and/or the like.

Example Computing Systems

Figure 6:
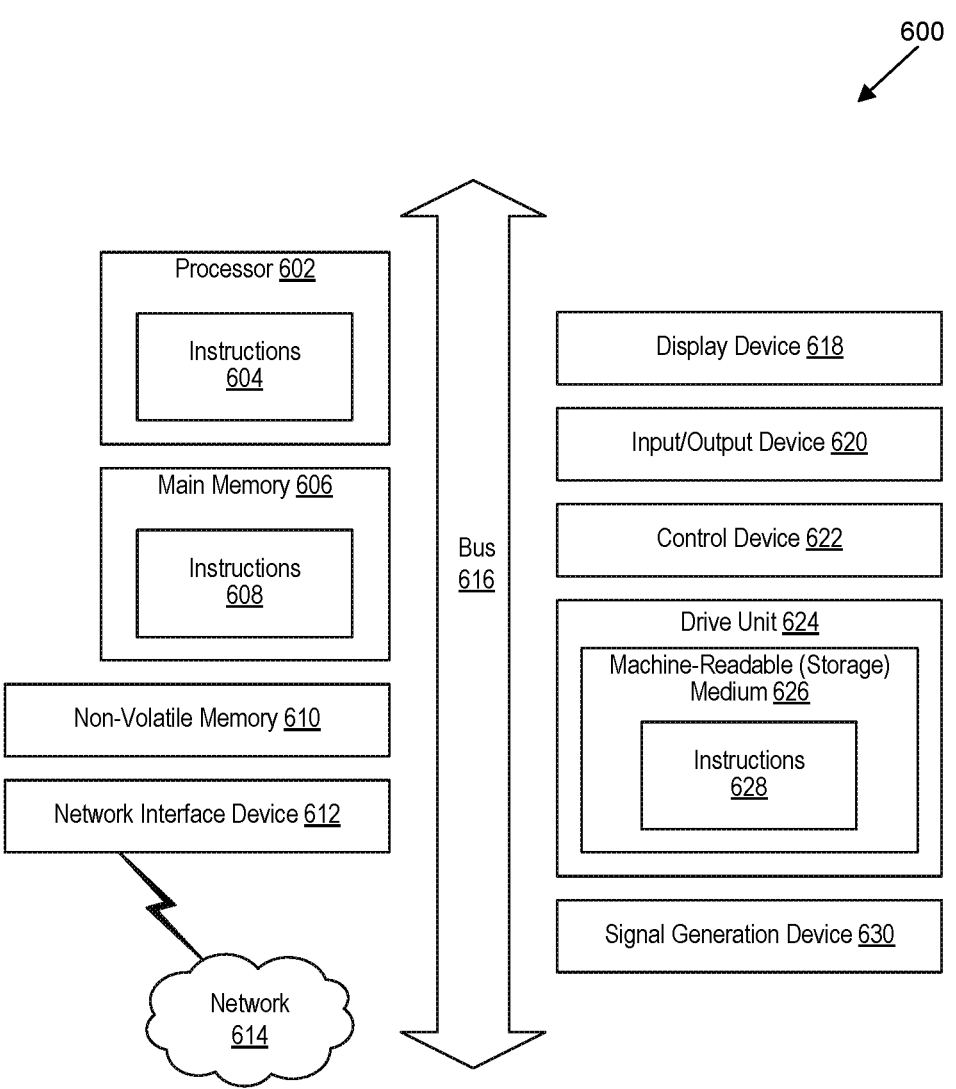
FIG. 6 is a block diagram that illustrates an example of a computing system in which at least some operations described herein can be implemented.

FIG. 6 is a block diagram that illustrates an example of a computing system 600 in which at least some operations or methods described herein can be implemented. As shown, the computing system 600 can include: one or more processors 602, main memory 606, non-volatile memory 610, a network interface device 612, a video display device 618, an input/output device 620, a control device 622 (e.g., keyboard and pointing device), a drive unit 624 that includes a machine-readable (storage) medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computing system 600 is intended to illustrate a hardware device on which components illustrated or described relative to the examples of the figures and any other components described in this specification can be implemented.

The computing system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementations, the computing system 600 can be an embedded computing system, a system-on-chip (SOC), a single-board computing system (SBC), or a distributed system such as a mesh of computing systems, or it can include one or more cloud components in one or more networks. Where appropriate, one or more computing systems 600 can perform operations in real time, in near real time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways.

Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, wherein the instructions when executed by at least one data processor of a first mobile phone physically operated by a subscriber of a telecommunication network, cause the first mobile phone to perform a process comprising:

transmitting, to a remote modeling server, a selection of a second mobile phone from a list of mobile phones available to the subscriber for use on the telecommunication network;

obtaining, from the remote modeling server, a virtual model of the second mobile phone and device specification information, wherein the remote modeling server is configured to store a virtual model of the first mobile phone and visual comparison data, wherein the virtual model of the second mobile phone is generated by visually altering the virtual model of the first mobile phone using the visual comparison data, and wherein the virtual model of the second mobile phone and the device specification information are mapped to a digital stock-keeping unit (SKU) identifier of the second mobile phone referenced by the remote modeling server;

continuously displaying the virtual model of the second mobile phone at a perceived three-dimensional depth within a real-time capture of a physical environment via a camera of the first mobile phone, such that the virtual model is partially obstructed by a finger of the subscriber's hand that is included in the real-time capture of the physical environment and assigned to a higher perceived three-dimensional depth, wherein continuously displaying the virtual model comprises displaying the device specification information anchored within a plane of the virtual model;

providing virtual content within the virtual model of the second mobile phone in response to determining virtual inputs on the virtual model of the second mobile phone from detected movements of the finger of the subscriber's hand; and enabling, during the continuous display of the virtual model within the real-time capture of the physical environment, initiation of a payment process in which the second mobile phone is delivered to the subscriber and the digital SKU identifier is stored under a subscriber profile.

2. The non-transitory, computer-readable storage medium of claim 1, wherein the process further comprises:

in response to transmitting the selection of the second mobile phone, receiving, from the remote modeling server, a set of compatible products associated with the second mobile phone, the set of compatible products including at least one of a wearable device that integrates with the second mobile phone or a device case that fits on the second mobile phone; and continuously displaying a virtual model of a selected compatible product from the set of compatible products with the virtual model of the second mobile phone.

3. The non-transitory, computer-readable storage medium of claim 1, wherein the process further comprises:

saving a snapshot image of the real-time capture of the physical environment including the virtual model of the second mobile phone; and embedding a resource reference within the snapshot image that causes the first mobile phone to open an extended reality (XR) user application in which the virtual model and the real-time capture of the physical environment were displayed.

4. The non-transitory, computer-readable storage medium of claim 1, wherein providing the virtual content comprises determining the virtual content according to an operating system (OS) of the second mobile phone.

5. The non-transitory, computer-readable storage medium of claim 4, wherein the OS of the second mobile phone is specified in the device specification information, and wherein the process further comprises virtually simulating the OS of the second mobile phone to determine the virtual content that is provided in response to the virtual inputs.

6. The non-transitory, computer-readable storage medium of claim 4, wherein the OS of the second mobile phone is virtually simulated by the remote modeling server, and wherein providing the virtual content comprises:

transmitting, to the remote modeling server, the virtual inputs determined from the detected movements of the physical member of the subscriber; and receiving, from the remote modeling server, the virtual content to provide within the virtual model of the second mobile phone.

7. The non-transitory, computer-readable storage medium of claim 4, wherein the OS of the second mobile phone is different than an operating system of the first mobile phone.

8. The non-transitory, computer-readable storage medium of claim 1, wherein the process further comprises:

during the real-time capture of the physical environment, determining that the subscriber has switched holding the first mobile phone to an opposite hand;

identifying a finger of the opposite hand to partially obstruct the virtual model; and tracking the finger of the opposite hand to detect movements thereof for the virtual inputs on the virtual model of the second mobile phone.

9. The non-transitory, computer-readable storage medium of claim 1, wherein the virtual content is provided within the virtual model further in response to detecting voice control inputs for the virtual model of the second mobile phone via a microphone of the first mobile phone.

10. A computing device comprising:

at least one hardware processor; and at least one non-transitory memory storing instructions, which, when executed by the at least one hardware processor, cause the computing device to:

transmit, to a remote modeling server, a selection of a network user device from a list of network user devices available to a subscriber for use on a telecommunication network;

obtain, from the remote modeling server, a virtual model of the network user device and device specification information that is associated with the network user device, wherein the remote modeling server is configured to store a virtual model of the computing device and visual comparison data, and wherein the virtual model of the network user device is generated by visually altering the virtual model of the first mobile phone using the visual comparison data;

continuously display the virtual model of the network user device within a real-time capture of a physical environment via a camera of the computing device underneath a physical member of the subscriber that is included in the real-time capture of the physical environment, wherein continuously displaying the virtual model comprises displaying the device specification information anchored within a plane of the virtual model; and provide virtual content within the virtual model of the network user device in response to determining virtual inputs on the virtual model of the network user device from detected movements of the physical member of the subscriber that visually obstructs the virtual model of the network user device.

11. The computing device of claim 10, wherein the instructions further cause the computing device to:

obtain a second virtual model of a compatible user product associated with the network user device; and include the second virtual model with the virtual model of the network user device within the real-time capture of the physical environment.

12. The computing device of claim 10, wherein the instructions further cause the computing device to:

save a snapshot image of the real-time capture of the physical environment including the virtual model of the network user device; and embed a web application link within the snapshot image that causes the computing device to provide a web application in which the network user device is pre-selected for the process to assign and deliver to the subscriber.

13. The computing device of claim 10, wherein the physical member of the subscriber belongs to a first hand of the subscriber opposite to a second hand of the subscriber that is holding the computing device, and wherein the instructions further cause the computing device to:

determine that the subscriber has switched to holding the computing device with the first hand;

identifying a physical member belonging to the second hand of the subscriber in order to display the virtual model underneath the identified physical member; and tracking the identified physical member to detect movements thereof for the virtual inputs on the virtual model.

14. The computing device of claim 13, wherein the computing device is caused to determine that the subscriber has switched to holding the computing device with the first hand via a movement sensor included in the computing device.

15. The computing device of claim 13, wherein the instructions further cause the computing device to:

execute, during the continuous display of the virtual model within the real-time capture of the physical environment, a payment process in which the network user device is delivered to the subscriber for use on the telecommunication network and indicated under subscriber profile information associated with the subscriber.

16. The computing device of claim 10, wherein providing the virtual content comprises determining the virtual content according to an operating system (OS) of the network user device, wherein the OS of the network user device is different than an OS of the computing device.

17. A method comprising:

obtaining, by a first device from a remote server, a virtual model of a second device based on a selection of the second device from a set of devices available for use by a subscriber operating the first device on a telecommunication network, wherein the remote server is configured to store a virtual model of the first device and visual comparison data, and wherein the virtual model of the second device is generated by visually altering the virtual model of the first device using the visual comparison data;

providing an extended reality (XR) display of the virtual model within a real-time capture of a physical environment that includes a digit of the subscriber, the digit of the subscriber being displayed above the virtual model;

in response to tracked movements of the digit of the subscriber that is displayed above the virtual model, updating the XR display of the virtual model to include virtual content on a virtual user interface of the virtual model of the second device based on virtual inputs represented by the tracked movements; and enabling, during the XR display of the virtual model, a purchase of the second device by the subscriber to replace the first device for use on the telecommunication network.

18. The method of claim 17, further comprising:

receiving device specification information that is associated with the second device; and including, with the XR display, the device specification information in visual containers that are anchored to the virtual model of the second device.

19. The method of claim 17, further comprising:

displaying, during the XR display of the virtual model, another digit of the subscriber above the virtual model based on a different hand of the subscriber being included in the real-time capture of the physical environment.

20. The method of claim 17, further comprising:

generating a snapshot image of the XR display, the snapshot image including a resource link via which the purchase of the second device is also enabled.

* * * * *